May 10, 1938.  W. C. HEDGCOCK  2,116,789
TRUCK
Filed Jan. 16, 1933    3 Sheets-Sheet 1
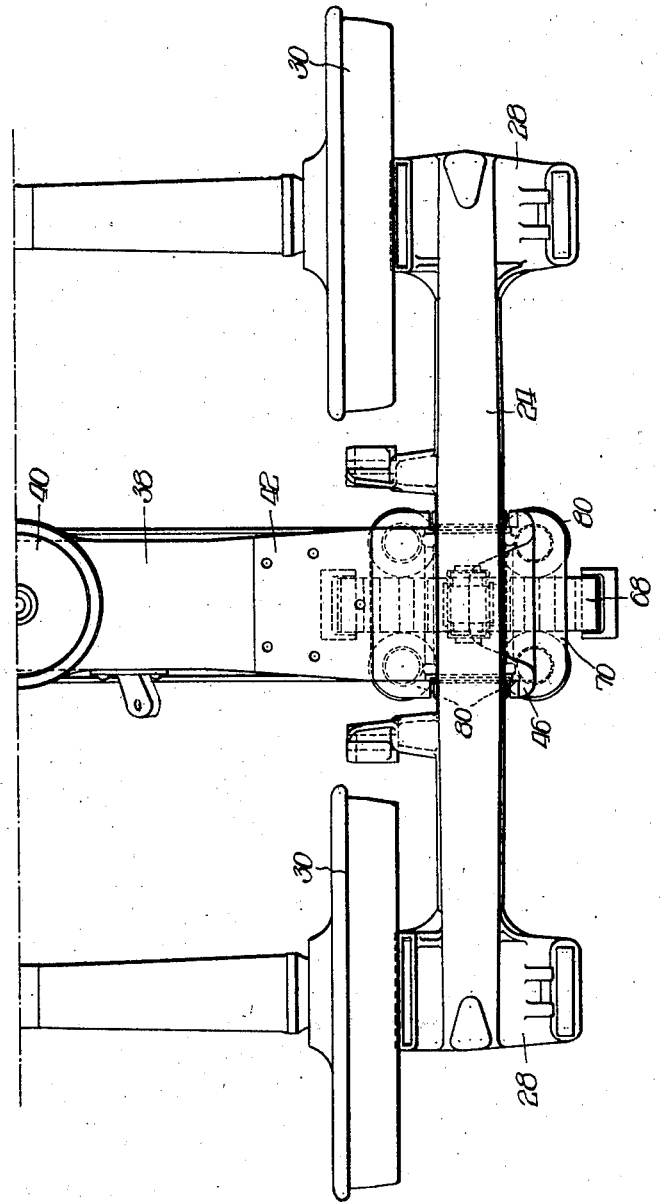
Inventor:
William C. Hedgcock,
By Wilkinson, Huxley, Byron & Knight
Attys.

May 10, 1938.　　　W. C. HEDGCOCK　　　2,116,789
TRUCK
Filed Jan. 16, 1933　　　3 Sheets-Sheet 2
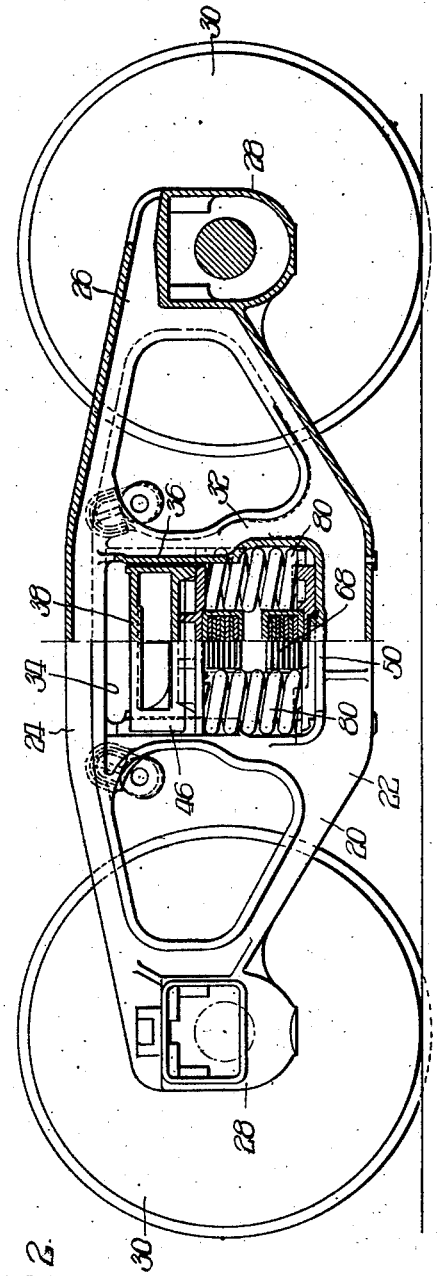
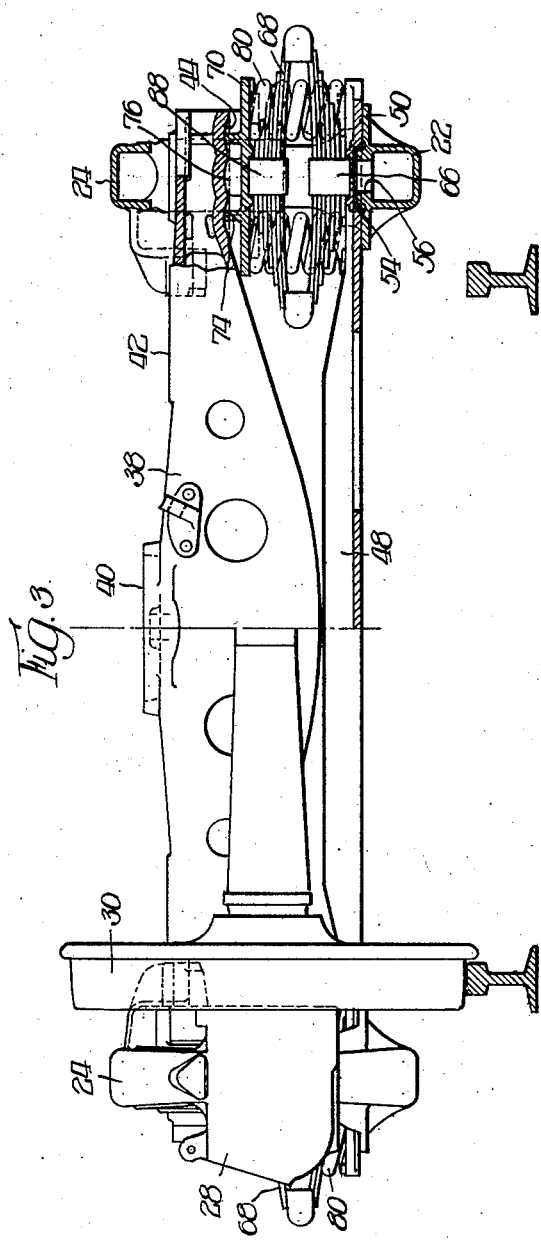
Inventor
William C. Hedgcock

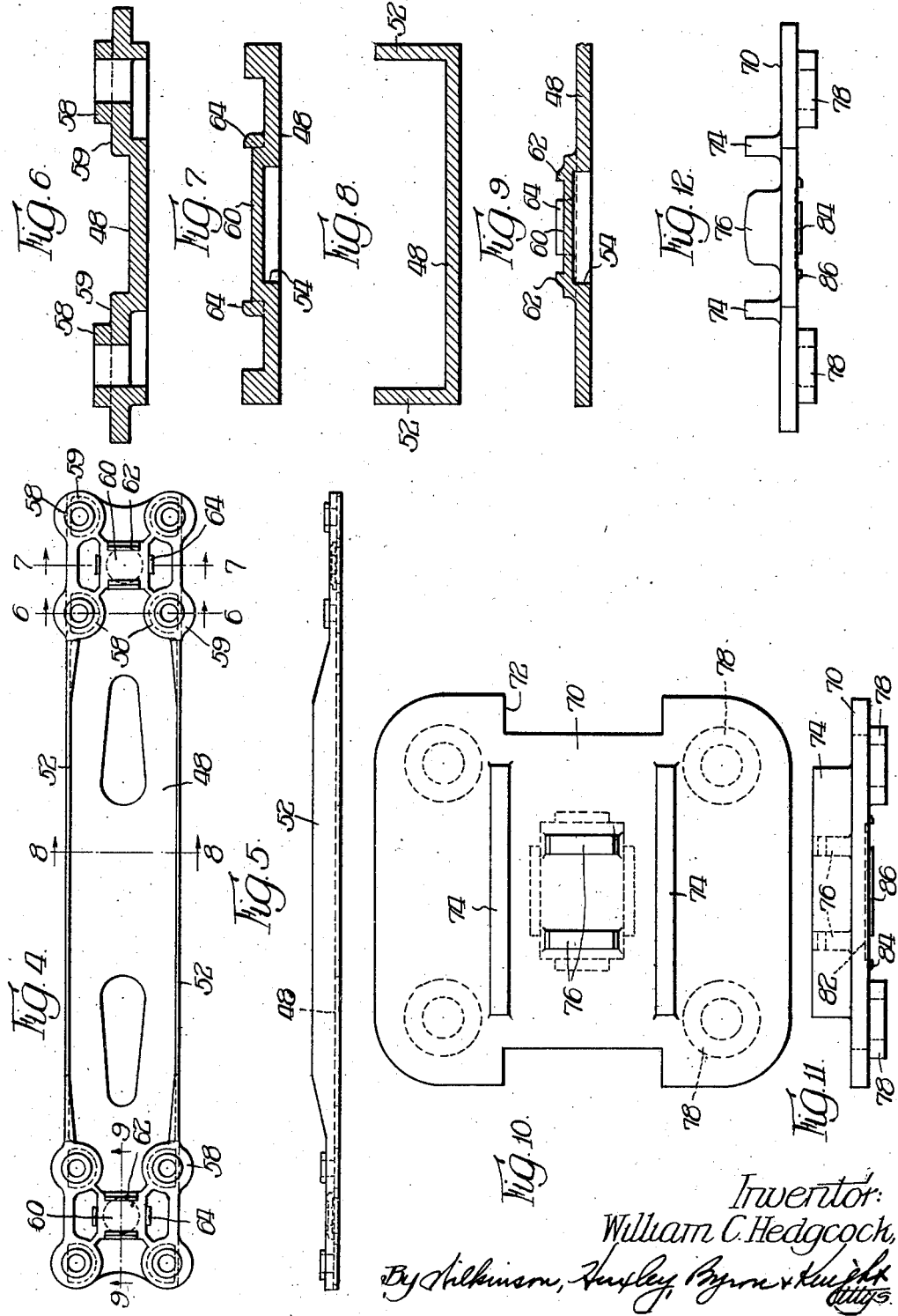

Patented May 10, 1938

2,116,789

UNITED STATES PATENT OFFICE 2,116,789

TRUCK

William C. Hedgcock, Wilmette, Ill., assignor to American Steel Foundries, Chicago, Ill., a corporation of New Jersey Application January 16, 1933, Serial No. 651,898

21 Claims. (Cl. 105—197.1)

This invention pertains to car trucks.

It is an object of this invention to provide means for adapting the conventional form of truck to a truck embodying springs of different character.

Another object is to provide a spring plank adapted for use with the conventional form of side frame for providing extended spring support over that of the conventional car truck.

Yet another object is to provide adapting means for converting a conventional lateral motion truck to a truck using springs of different character.

A further object is to provide means for adapting a car truck with integral side frames to a truck having a combination of coil and elliptic springs wherein increased spring capacity is provided for the truck.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a truck construction embodying the invention;

Figure 2 is a side elevation partly in section of the truck construction illustrated in Figure 1, the section being taken substantially in a plane through the longitudinal center line of the side frame;

Figure 3 is an end elevation partly in section of the truck construction illustrated in Figure 1, the section being taken substantially in the plane of the transverse center line of the truck;

Figure 4 is a top plan view of a spring plank adapted for use with the truck construction shown in Figures 1, 2 and 3;

Figure 5 is a side elevation of the spring plank illustrated in Figure 4;

Figure 6 is a transverse sectional elevation taken substantially in the plane as indicated by the line 6—6 of Figure 4;

Figure 7 is a transverse sectional elevation taken substantially in the plane as indicated by the line 7—7 of Figure 4;

Figure 8 is a transverse sectional elevation taken substantially in the plane as indicated by the line 8—8 of Figure 4;

Figure 9 is a fragmentary longitudinal sectional elevation taken substantially in the plane as indicated by the line 9—9 of Figure 4;

Figure 10 is a top plan view of a spring cap adapted for use with the truck construction illustrated in Figures 1, 2 and 3;

Figure 11 is a side elevation of the spring cap illustrated in Figure 10;

Figure 12 is an end elevation of the spring cap illustrated in Figure 10.

In the truck construction illustrated in Figures 1, 2 and 3, the conventional truss side frame 20 is shown including the tension member 22 and the compression member 24, said members merging adjacent the ends thereof as at 26 and provided with the journal boxes 28 having cooperative relation with the journal ends of the wheel and axle assemblies 30. The tension and compression members are integrally connected by means of the spaced columns 32 forming the window or bolster opening 34 with portions of said tension and compression members. The columns 32 are provided with the column guide portions 36 adapted to have guiding cooperation with column guide cooperating portions provided on the bolster 38. The bolster is provided with the center bearing 40 and the side bearings 42, and, in the constructions shown, is of the lateral motion type, being provided with the spaced roller seats 44, the outer lug 46 being provided on said bolster for normally limiting the lateral movement thereof.

The conventional form of lateral motion truck is provided only with coil springs, and some adapting means must be provided for converting this type of truck to a truck construction wherein a combination of coil and elliptic springs is used for mounting the load carrying member, such as the bolster on the side frame and spring plank. In order to accomplish this result, which produces a truck of much improved riding qualities, the spring plank 48 is used in place of the usual rolled spring plank for tying the spaced side frames together.

This spring plank 48 is preferably a casting and is so shaped as to fit within the bolster opening of the side frames, and extends beyond the edges of the side frame spring seat portion 50 normally provided on the tension member between the columns 32. The spring plank is preferably channel shaped in section, the flanges 52 being deep adjacent the center to give the proper beam strength, and said plank is provided with means such as the socket 54 adapted to embrace or register with the positioning dowel 56 provided on the side frame serving as interlocking means for properly tying the side frames together. Thus the portion of the spring plank projecting over the side frame seat is made to carry the load without further reenforcing means. The spring plank is provided with spaced upwardly extending dowels 58 providing positioning means for the coil springs and defining seats 59. A leaf spring seat 60 is provided intermediate the coil springs seats, said spring seat being defined by the spaced lugs 62 and 64 adapted to embrace the lower spring band 66 of the elliptic spring assembly 68.

The upper adapter for completing the assembly is shown in the form of a spring cap 70, said spring cap being provided on opposite edges with the interrupted portion 72 forming positioning means for registration with the column guide portions 36 of the columns whereby the spring cap is permitted vertical movement with respect to the column guides but is substantially stationary transversely of the truck. The spring cap is provided with upwardly extended spaced flanges or lugs 74 adapted to engage in the outer roller tracks 44 and the spring cap is provided with intermediate spaced substantially arcuate lugs 76 extending normally to the flanges 74 and being adapted to register with the intermediate track 44 whereby the flanges and lugs form positioning means for registration with relative parts of the bolster.

The lower side of the spring cap is provided with the spaced coil spring seats 78 adapted to be spaced similarly to the seats 59 and in substantially vertical alignment therewith whereby the coil springs 80 are disposed in supporting relation between the seats 59 and 78. The spring cap is likewise provided with the leaf spring seat 82 defined by the spaced lugs 84 and 86 for accommodating the upper spring band 88 of the leaf spring assembly 68.

With the construction thus provided existing trucks may be readily adapted to the use of coil and elliptic spring groups providing a truck of improved riding qualities and increased spring capacity.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a truck, the combination of spaced side frames each including tension and compression members merging adjacent the ends thereof and provided with journal means having cooperative relation with the journal ends of wheel and axle assemblies, spaced columns integral with said tension and compression members and forming a window therewith, a bolster extending into said window of each of said side frames, a spring plank extending through each of said windows and secured to the tension members, said spring plank having spaced coil spring seats disposed substantially inwardly and outwardly of said columns and having a leaf spring seat disposed between said coil spring seats and substantially in the plane of said side frames, coil and elliptic leaf springs disposed on the respective seats and in supporting relation to said bolster, a spring cap interposed between said springs and said bolster, said spring cap having a portion interlocking with said columns and slidably cooperating therewith, spaced positioning and supporting lugs engaging said bolster, and spaced coil and leaf spring seats spaced similarly to said first named coil and leaf spring seats and in engagement with said springs.

2. In a truck, the combination of spaced side frames each including tension and compression members merging adjacent the ends thereof and provided with journal means having cooperative relation with the journal ends of wheel and axle assemblies, spaced columns integral with said tension and compression members and forming a window therewith, a bolster extending into the window of each of said side frames, a cast spring plank extending through each of said windows and secured to the tension members, said spring plank having spaced coil spring seats disposed substantially inwardly and outwardly of said columns and having a leaf spring seat disposed between said coil spring seats and substantially in the plane of said side frames, coil and elliptic leaf springs disposed on the respective seats and in supporting relation to said bolster, a cast spring cap interposed between said springs and said bolster, said spring cap having a portion interlocking with said columns and slidably cooperating therewith, spaced positioning and supporting lugs on one side of said cap engaging said bolster, and spaced coil and leaf spring seats on the opposite side of said cap spaced similarly to said first named coil and leaf spring seats and in engagement with said springs.

3. In a truck, the combination of spaced side frames each including tension and compression members merging adjacent the ends thereof and provided with journal means having cooperative relation with the journal ends of wheel and axle assemblies, spaced columns integral with said tension and compression members and forming a window therewith, a bolster extending into said window of each of said side frames, coil and leaf spring seats supported on said side frames and supporting said bolster, a spring cap interposed between said springs and said bolster, said spring cap having a portion interlocking with said columns and slidably cooperating therewith, spaced positioning and supporting lugs engaging said bolster, and spaced coil and leaf spring seats in engagement with said springs.

4. In a truck, the combination of spaced side frames each including tension and compression members merging adjacent the ends thereof and provided with journal means having cooperative relation with the journal ends of wheel and axle assemblies, spaced columns integral with said tension and compression members and forming a window therewith, a bolster extending into the window of each of said side frames, coil and leaf spring seats supported on said side frames and supporting said bolster a spring cap interposed between said springs and said bolster, said spring cap having a portion interlocking with said columns and slidably cooperating therewith, spaced positioning and supporting lugs on one side of said spring cap engaging said bolster, and spaced coil and leaf spring seats on the opposite side of said spring cap and in engagement with said springs.

5. In a truck, the combination of spaced side frames each including tension and compression members merging adjacent the ends thereof and provided with journal means having cooperative relation with the journal ends of wheel and axle assemblies, spaced columns integral with said tension and compression members and forming a window therewith, a load carrying member extending into the window of each of said side frames, a cast spring plank extending through each of said windows and secured to the tension members, said spring plank having spaced coil spring seats disposed substantially inwardly and outwardly of said columns and having a leaf spring seat disposed between said coil spring seats and substantially in the plane of said side frames, coil and leaf springs disposed on the respective seats and in supporting relation to said load carrying member, a spring cap interposed between said springs and said load carrying member, said spring cap having a portion interlocking with said columns and slidably cooperating therewith, spaced positioning and supporting lugs engaging said load carrying member, and spaced coil and leaf spring seats spaced similarly to said first named coil and leaf spring seats and in engagement with said springs.

6. In a truck, the combination of spaced side frames each including tension and compression members merging adjacent the ends thereof and provided with journal means having cooperative relation with the journal ends of wheel and axle assemblies, spaced columns integral with said tension and compression members and forming a window therewith, a load carrying member extending into the window of each of said side frames, a cast spring plank extending through each of said windows and secured to the tension members, said spring plank having spaced coil spring seats disposed substantially inwardly and outwardly of said columns and having a leaf spring seat disposed between said coil spring seats and substantially in the plane of said side frames, coil and leaf springs disposed on the respective seats and in supporting relation to said load carrying member, a cast spring cap interposed between said springs and said load carrying member, said spring cap having a portion interlocking with said columns and slidably cooperating therewith, spaced positioning and supporting lugs on one side of said cap engaging said load carrying member, and spaced coil and leaf spring seats on the opposite side of said cap spaced similarly to said first named coil and leaf spring seats and in engagement with said springs.

7. In a truck, the combination of spaced side frames each including tension and compression members merging adjacent the ends thereof and provided with journal means having cooperative relation with the journal ends of wheel and axle assemblies, spaced columns integral with said tension and compresion members and forming a window therewith, a load carrying member extending into the window of each of said side frames, coil and leaf spring seats supported on said side frames and supporting said load carrying member, a spring cap interposed between said springs and said load carrying member, said spring cap having a portion interlocking with said columns and slidably cooperating therewith, spaced positioning and supporting lugs on one side of said spring cap engaging said load carrying member, and spaced coil and leaf spring seats on the opposite side of said spring cap and in engagement with said springs.

8. A spring plank including a flanged portion extending from the intermediate part to the ends thereof, said flanges diminishing toward said ends, spaced coil spring seats disposed outwardly of said flanges, a leaf spring seat disposed between said coil spring seats, and side frame positioning means provided on said ends.

9. A cast spring plank including a flanged portion intermediate the ends thereof, said flanges diminishing toward said ends, spaced coil spring seats disposed outwardly of said flanges, a leaf spring seat disposed between said coil spring seats, and side frame positioning means provided on said ends and substantially in vertical alignment with said leaf spring seats.

10. A spring cap including a body portion having spaced coil spring seats, a leaf spring seat between said coil spring seats, said body portion having cut out portions on opposite edges for engagement with columns of a side frame, and spaced lugs disposed in substantially normal relation to one another on the opposite side of said body portion from said spring seats for positioning engagement with a movable load carrying member of a truck.

11. In a truck, the combination of spaced side frames each including tension and compression members merging adjacent the ends thereof and provided with journal means having cooperative relation with the journal ends of wheel and axle assemblies, spaced columns integral with said tension and compression members and forming a window therewith, a lateral motion load carrying member extending into the window of each of said side frames, said load carrying member having lateral motion tracks, a cast spring plank extending through each of said windows and secured to the tension members, said spring plank having spaced coil spring seats disposed substantially inwardly and outwardly of said columns and having a leaf spring seat disposed between said coil spring seats and substantially in the plane of said side frames, coil and leaf springs disposed on the respective seats and in supporting relation to said bolster, a spring cap interposed between said springs and said bolster, said spring cap having a portion interlocking with said columns and slidably cooperating therewith, spaced positioning means engaging the tracks of said load carrying member for preventing lateral motion of said load carrying member, said spring cap having spaced coil and leaf spring seats on the side opposite to said positioning means, said seats being spaced similarly to said first named coil and leaf spring seats and in engagement with said springs.

12. A side frame formed with a window opening defined by guide columns, a bolster with an end portion received in said opening, and a supporting member underlying said end portion and normally supported by bolster springs, the supported portion of said bolster having downwardly opening pockets adapted to receive lateral motion rollers, and the corresponding portion of the supporting member comprising upstanding flanges, the upper surfaces of which are correspondingly curved to engage the surfaces of, and interlock in, said pockets.

13. A side frame formed with a window opening defined by guide columns, a load carrying member with an end portion received in said opening, and a supporting member underlying said end portion and normally supported by springs, the supported portion of said load carrying member having downwardly opening pockets adapted to receive lateral motion rollers, and the corresponding portion of the supporting member comprising upstanding flanges, the upper surfaces of which are correspondingly curved to engage the surfaces of, and interlock in, said pockets.

14. A side frame formed with a window opening defined by guide columns, a load carrying member with an end portion received in said opening, and a supporting member underlying said end portion and normally supported by springs, the supported portion of said load carrying member having downwardly opening pockets adapted to receive lateral motion rollers, and the corresponding portion of the supporting member comprising spaced inner and outer flanges, the upper surfaces of which are correspondingly curved to engage the surfaces of, and interlock in, said pockets.

15. A side frame formed with a window opening defined by guide columns, a load carrying member with an end portion received in said opening, and a supporting member underlying said end portion and normally supported by springs, the supported portion of said load carrying member having downwardly opening pockets adapted to receive lateral motion rollers, and the corresponding portion of the supporting member comprising spaced inner and outer flanges disposed substantially longitudinally and transversely of the side frame, the upper surfaces of which are correspondingly curved to engage the surfaces of, and interlock in, said pockets.

16. A side frame formed with a window opening defined by guide columns, a load carrying member with an end portion received in said opening, and a supporting member underlying said end portion and normally supported by springs, the supported portion of said load carrying member having downwardly opening pockets adapted to receive lateral motion rollers, and the corresponding portion of the supporting member comprising spaced inner and outer flanges disposed substantially longitudinally and transversely of the side frame, said longitudinally and transversely disposed flanges being of different lengths and the upper surfaces of which are correspondingly curved to engage the surfaces of, and interlock in, said pockets.

17. A side frame formed with a window opening defined by guide columns, a load carrying member with an end portion received in said opening, and a supporting member underlying said end portion and normally supported by springs, the supported portion of said load carrying member having downwardly opening pockets adapted to receive lateral motion rollers, and the corresponding portion of the supporting member comprising spaced inner and outer flanges disposed substantially longitudinally and transversely of the side frame, said longitudinally disposed flanges being of greater length than said transversely disposed flanges, and said flanges having the upper surfaces thereof correspondingly curved to engage the surfaces of, and interlock in, said pockets.

18. A spring cap including a body portion having spaced coil spring seats, a leaf spring seat between said coil spring seats, said body portion having cut out portions on opposite edges for engagement with columns of a side frame, and inner and outer spaced lugs on the opposite side of said body portion from said spring seats for positioning engagement with a movable load carrying member of a truck.

19. A spring cap including a body portion having spaced coil spring seats, a leaf spring seat between said coil spring seats, said body portion having cut out portions on opposite edges for engagement with columns of a side frame, and inner and outer spaced lugs disposed substantially normal to one another on the opposite side of said body portion from said springs seats for positioning engagement with a movable load carrying member of a truck.

20. A spring cap including a body portion having spaced coil spring seats, a leaf spring seat between said coil spring seats, said body portion having cut out portions on opposite edges for engagement with columns of a side frame, and inner and outer spaced lugs disposed substantially normal to one another on the opposite side of said body portion from said spring seats for positioning engagement with a movable load carrying member of a truck, said inner and outer spaced lugs being of different lengths.

21. A spring cap including a body portion having spaced coil spring seats, a leaf spring seat between said coil spring seats, said body portion having cut out portions on opposite edges for engagement with columns of a side frame, and inner and outer spaced lugs disposed substantially normal to one another on the opposite side of said body portion from said springs seats for positioning engagement with a movable load carrying member of a truck, said outer spaced lugs being of greater length than said inner spaced lugs.

WILLIAM C. HEDGCOCK.